US009544829B1

(12) United States Patent
Singh et al.

(10) Patent No.: US 9,544,829 B1
(45) Date of Patent: Jan. 10, 2017

(54) DYNAMIC SELECTION AND USE OF HANDOFF THRESHOLD

(71) Applicant: Sprint Spectrum L.P., Overland Park, KS (US)

(72) Inventors: Jasinder P. Singh, Olathe, KS (US); Deveshkumar Rai, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 571 days.

(21) Appl. No.: 13/860,275

(22) Filed: Apr. 10, 2013

(51) Int. Cl.
*H04W 36/30* (2009.01)

(52) U.S. Cl.
CPC .................................... *H04W 36/30* (2013.01)

(58) Field of Classification Search
CPC ........... H04W 84/045; H04W 36/0083; H04W 24/10; H04W 36/0055; H04W 36/08; H04W 36/0061
See application file for complete search history.

(56) References Cited

U.S. PATENT DOCUMENTS

| 6,104,927 | A | 8/2000 | Willey |
| 6,563,809 | B1 | 5/2003 | Proctor, Jr. et al. |
| 7,174,152 | B1 | 2/2007 | Oleniczak et al. |
| 7,206,593 | B1 | 4/2007 | Yarkosky et al. |
| 7,477,920 | B2 | 1/2009 | Scheinert et al. |
| 7,519,077 | B2 | 4/2009 | Beathard |
| 7,636,322 | B1 | 12/2009 | Gandhi et al. |
| 7,848,282 | B2 | 12/2010 | Padovani et al. |
| 7,974,241 | B2 | 7/2011 | Aaron |
| 8,040,803 | B1 | 10/2011 | Pawar et al. |
| 8,107,438 | B1 | 1/2012 | Singh et al. |
| 8,204,000 | B1 | 6/2012 | Srinivas et al. |
| 8,249,498 | B1 | 8/2012 | Pulugurta |
| 8,606,219 | B1 | 12/2013 | Barbee et al. |
| 2001/0007552 | A1* | 7/2001 | Schiff et al. .................. 370/331 |
| 2004/0049699 | A1 | 3/2004 | Griffith et al. |

(Continued)

FOREIGN PATENT DOCUMENTS

| WO | WO 00/65863 | 11/2000 |
| WO | WO 01/47288 | 6/2001 |
| WO | WO 2011/143815 | 11/2011 |

OTHER PUBLICATIONS

U.S. Appl. No. 13/605,683, filed Sep. 6, 2012.

(Continued)

*Primary Examiner* — Jung Park (57) ABSTRACT

A network node receives from a mobile terminal being served by a first coverage area a measurement report indicating signal level of a second coverage area detected by the mobile terminal. The network node then makes a determination, by considering PLMNs of the mobile terminal and of the coverage areas, of (i) whether the mobile node is a home mobile node of the first coverage area and (ii) whether the mobile node is a home mobile node of the second coverage area. Based on that determination, the network node then selects a handoff threshold. And based on the handoff threshold and the reported signal level, the network node decides whether to trigger handoff of the mobile terminal from the first coverage area to the second coverage area. The network node then triggers the handoff if the decision is to do so.

20 Claims, 4 Drawing Sheets

(56) References Cited

U.S. PATENT DOCUMENTS

| | | |
|---|---|---|
| 2007/0178906 A1 | 8/2007 | Gao et al. |
| 2007/0242702 A1 | 10/2007 | Shim |
| 2008/0026715 A1 | 1/2008 | Gao |
| 2008/0049706 A1 | 2/2008 | Khandekar et al. |
| 2008/0066161 A1 | 3/2008 | Ohhira |
| 2009/0086629 A1 | 4/2009 | Zhang et al. |
| 2009/0170547 A1 | 7/2009 | Raghothaman et al. |
| 2009/0203381 A1* | 8/2009 | Ueda ............................ 455/439 |
| 2009/0257361 A1 | 10/2009 | Deshpande et al. |
| 2009/0280836 A1 | 11/2009 | Chou |
| 2009/0285159 A1 | 11/2009 | Rezaiifar et al. |
| 2011/0201335 A1 | 8/2011 | Garrett et al. |
| 2011/0275369 A1* | 11/2011 | Bartlett et al. ................ 455/433 |
| 2011/0305197 A1 | 12/2011 | Park et al. |
| 2012/0003959 A1 | 1/2012 | Gonzalez-Canedo et al. |
| 2013/0045706 A1 | 2/2013 | Hsu |
| 2013/0090124 A1 | 4/2013 | Panchal et al. |
| 2013/0273917 A1* | 10/2013 | Sfar ............................. 455/436 |

OTHER PUBLICATIONS

U.S. Appl. No. 12/371,165, filed Feb. 13, 2009.
3rd Generation Partnership Project 2 "3GPP2", "Upper Layer (Layer 3) Signaling Standard for cdma2000 Spread Spectrum Systems," 3GPP2 C.50005-E, Version 3.0, Jun. 2011.

* cited by examiner

DYNAMIC SELECTION AND USE OF HANDOFF THRESHOLD

BACKGROUND

Unless otherwise indicated herein, the materials described in this section are not prior art to the claims and are not admitted to be prior art by inclusion in this section.

In a typical market area, wireless service providers may operate radio access networks (RANs) each arranged to provide mobile terminals with wireless communication service. Each such a RAN may include a number of base stations that radiate to define wireless coverage areas in which to serve mobile terminals according to a radio access technology such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1xRTT and 1xEV-DO), GSM, GPRS, UMTS, EDGE, iDEN, TDMA, AMPS, MMDS, WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a mobile terminal within coverage of the RAN may engage in air interface communication with a base station and may thereby communicate via the base station with various remote network entities or with other mobile terminals served by the base station or by other base stations.

In general, a wireless service provider may operate one or more such RANs as a public land mobile network (PLMN) for serving mobile terminals that subscribe to service of the provider. For example, a service provider may operate a CDMA PLMN and may provide mobile terminals with subscriptions that allow the terminals to receive CDMA service from that PLMN. As another example, a service provider may operate an LTE RAN as a PLMN and may provide mobile terminals with subscriptions that allow the terminals to receive LTE service from that PLMN. And as another example, a service provider may operate both a CDMA PLMN and an LTE PLMN and may provide mobile terminals with subscriptions that allow the terminals to receive both CDMA service from the CDMA PLMN and LTE service from the LTE PLMN.

In practice, a RAN operating as a PLMN may have an associated PLMN identifier (PLMN ID), and base stations of the RAN may be arranged to broadcast that PLMN ID to indicate that the base stations are part of that PLMN. Mobile terminals that subscribe to service of a wireless service provider's PLMN may then be provisioned with data indicating the PLMN ID of the PLMN and with logic that causes the mobile terminals to prefer service by base stations broadcasting that PLMN ID. Further, mobile terminals that subscribe to service of multiple PLMNs, such as both an LTE PLMN and a CDMA PLMN may be provisioned with data indicating the PLMN IDs of each such PLMN and with logic that causes the mobile terminals to prefer service by base stations broadcasting one or more of those PLMN IDs.

In addition to operating a RAN as its own PLMN, a wireless service provider may also operate a RAN on behalf of one or more other wireless service providers known as "mobile virtual network operators" (MVNOs), to allow the MVNOs to provide wireless communication service without the need to build out RANs of their own. To facilitate this, the service provider may not only operate the RAN as its own PLMN for serving mobile terminals that subscribe to its own service but may also operate the RAN as another PLMN for serving mobile terminals that subscribe to the MVNO. As such, base stations of the RAN may be arranged to broadcast not only their base PLMN ID indicating that they are part of the wireless service provider's PLMN but also an MVNO PLMN ID indicating that they are part of the MVNO's PLMN. Further, mobile terminals that subscribe to service of the MVNO may be provisioned with data indicating the MVNO PLMN ID and with logic that causes the mobile terminals to prefer service by base stations broadcasting that MVNO PLMN ID.

In practice, an MVNO may be a different company than the actual RAN operator or may be the same company as the actual RAN operator. In either case, wireless communication service offered by the MVNO may be branded differently than that offered by the actual RAN operator. Further, the RAN may be configured to provide different levels or types of service to mobile terminals that subscribe to service of the actual RAN operator than to mobile terminals that subscribe to service of particular MVNOs.

In addition, a wireless service provider that functions as an MVNO using base stations of another service provider may also operate its own RAN in certain locations, and may in fact host service for the other service provider in certain locations such that the other service provider would function as an MVNO in those locations. Thus, a service provider may operate a first RAN and provide mobile terminals with subscriptions of a first PLMN having a first PLMN ID, and a second service provider may operate a second RAN and may provide mobile terminals with subscriptions of a second PLMN having a second PLMN ID. Base stations of the first RAN may then be part of the first service provider's PLMN, broadcasting the first PLMN ID and also part of the second service provider's PLMN, broadcasting the second PLMN ID. Further, base stations of the second service provider's RAN may also be part of the second service provider's PLMN, broadcasting the second PLMN ID and might also be part of the first service provider's PLMN, broadcasting the first PLMN ID.

Still further, a wireless service provider may allow one or more of its PLMNs to serve mobile terminals that subscribe to service of other PLMNs, pursuant to a roaming agreement. In particular, a first service provider providing a first PLMN may enter into a roaming agreement with a second service provider providing a second PLMN, according to which the first PLMN will serve mobile terminals that subscribe to the second PLMN, and the second service provider will compensate the first service provider for providing that service. As such, a mobile terminal that subscribes to service of the second PLMN but that is not within sufficient coverage of the second PLMN may instead opt to be served by the first PLMN.

OVERVIEW

Disclosed herein is a method and corresponding system for managing handoff of a mobile terminal from a currently serving wireless coverage to a target wireless coverage area, with a handoff threshold being based on whether the mobile terminal is a home terminal of the serving coverage area and whether the mobile terminal is a home terminal of the target coverage area.

A mobile terminal may be a home terminal of a given coverage area if the mobile terminal subscribes to a particular PLMN and the given coverage area has a PLMN corresponding with that particular PLMN, such as if the given coverage area is part of that particular PLMN or is part of a PLMN that has an MVNO relationship with that particular PLMN. On the other hand, a mobile terminal may be a non-home terminal of a given coverage area if the mobile terminal subscribes to a particular PLMN and the given coverage area is not a member of that particular PLMN or of a PLMN that has an MVNO relationship with that particular PLMN, such is if the given coverage area is operated by another service provider having a roaming agreement with the mobile terminal's service provider for instance.

Thus, at issue in the present disclosure may be whether the serving coverage area corresponds with a PLMN to which the mobile terminal subscribes (e.g., has (i.e., is a member of) a PLMN that is the same as a PLMN to which the mobile terminal subscribes or is associated with (e.g., in an MVNO relationship with) a PLMN to which the mobile terminal subscribes) and whether the target coverage area corresponds with a PLMN to which the mobile terminal subscribes (e.g., has a PLMN that is the same as a PLMN to which the mobile terminal subscribes or is associated with (e.g., in an MVNO relationship with) a PLMN to which the mobile terminal subscribes).

If both the serving coverage area and target coverage area correspond with a PLMN to which the mobile terminal subscribes, then a particular handoff threshold may be applied as a basis to determine whether to trigger handoff of the mobile terminal from the serving coverage area to the target coverage area. Whereas, if the serving coverage area corresponds with a PLMN to which the mobile terminal subscribes but the target coverage area does not, then a more stringent handoff threshold may be applied, to deter the handoff. And if the serving coverage area does not correspond with a PLMN to which the mobile terminal subscribes but the target coverage area does, then a more lenient handoff threshold may be applied, to foster the handoff.

Accordingly, in one respect, the method may involve a scenario where a mobile terminal subscribes to a particular PLMN and is currently being served by a serving coverage area, and where a network node receives from the mobile terminal a measurement report specifying a signal level of a neighboring coverage area. In accordance with the method, the network node may then make a determination of (i) whether the serving coverage area corresponds with the PLMN and (ii) whether the neighboring coverage area corresponds with the PLMN. Based on the determination, the network node may then select a handoff threshold. And based on the selected handoff threshold and the specified signal level of the neighboring coverage area, the network node may then make a decision of whether to trigger a handoff of the mobile terminal from the serving coverage area to the neighboring coverage area. The network node may then trigger the handoff only if the decision is to trigger the handoff.

In practice, the handoff threshold may take various forms. For instance, the handoff threshold may be a threshold minimum extent by which signal level of the neighboring coverage area must exceed signal level of the serving coverage area in order to trigger the handoff, or the handoff threshold may be a threshold minimum signal level of the neighboring coverage area in order to trigger the handoff. If that case, if network node determines that both the serving coverage area and neighboring coverage area correspond with the PLMN to which the mobile terminal subscribes or that both the serving coverage area and neighboring coverage area do not correspond with the PLMN to which the mobile terminal subscribes, the network node may then select a default threshold. Whereas, if the network node determines that the serving coverage area corresponds with the PLMN to which the mobile terminal subscribes but the neighboring coverage area does not correspond with the PLMN to which the mobile terminal subscribes, then the network node may select a higher threshold, to require the neighboring coverage area to be stronger or relatively stronger before triggering the handoff. And if the network node determines that the serving coverage area does not correspond with the PLMN to which the mobile terminal subscribes but the neighboring coverage area corresponds with the PLMN to which the mobile terminal subscribes, then the network node may select a lower threshold, to allow the handoff to more readily occur.

In another respect, the method may involve a scenario where a first base station is serving a mobile terminal and the base station wirelessly receives from the mobile terminal a measurement report indicating a signal level of a second base station as determined by the mobile terminal. In accordance with the method, the first base station may then make a determination of (i) whether the mobile terminal is a home mobile terminal of the first base station and (ii) whether the mobile terminal is a home mobile terminal of the second base station. Based on that determination, the first base station may then select a handoff threshold. And the first base station may then make a decision, based on the selected handoff threshold and the specified signal level of the second base station, of whether to trigger a handoff of the mobile terminal from being served by the first base station to being served by the second base station. The first base station my then trigger the handoff only if the decision is to trigger the handoff.

Still further, in another respect, a corresponding system may include a first base station and a controller, perhaps integrated together with the controller being part of the first base station for instance. The first base station may include an antenna arrangement for radiating to define a cellular coverage in which to serve mobile terminals. And the controller may be configured to carry out various functions such as those described above. In particular, the controller may be configured to receive via the antenna arrangement, from a mobile terminal served by the first base station, a measurement report indicating signal level of a second base station as determined by the mobile terminal, and to make a determination, based on a PLMN ID of the mobile terminal, whether the mobile terminal is a home mobile terminal of the first base station and whether the mobile terminal is a home mobile terminal of the second base station. Further, the controller may be configured to select a handoff threshold based on the determination and to make a decision, based on the selected handoff threshold and the specified signal level of the second base station, whether to trigger a handoff of the mobile terminal from being served by the first base station to being served by the second base station. The controller may then trigger the handoff only if the decision is to trigger the handoff.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of an example communication system in which the present method can be implemented. The illustrated system includes three representative RANs, designated RAN 1, RAN 2, and RAN 3. Each of these RANs includes one or more base stations interconnected with supporting network infrastructure that provides connectivity with one or more transport networks 12 such as the PSTN and the Internet, with each base station radiating to define at least one coverage area such as a cell sector for instance. In particular, RAN 1 includes one or more base stations 14 interconnected with supporting infrastructure 16 and radiating to define one or more coverage areas 18; RAN 2 includes one or more base stations 20 interconnected with supporting infrastructure 22 and radiating to define one or more coverage areas 24; and RAN 3 includes one or more base stations 26 interconnected with supporting infrastructure 28 and radiating to define one or more coverage areas 30.

Figure 1:
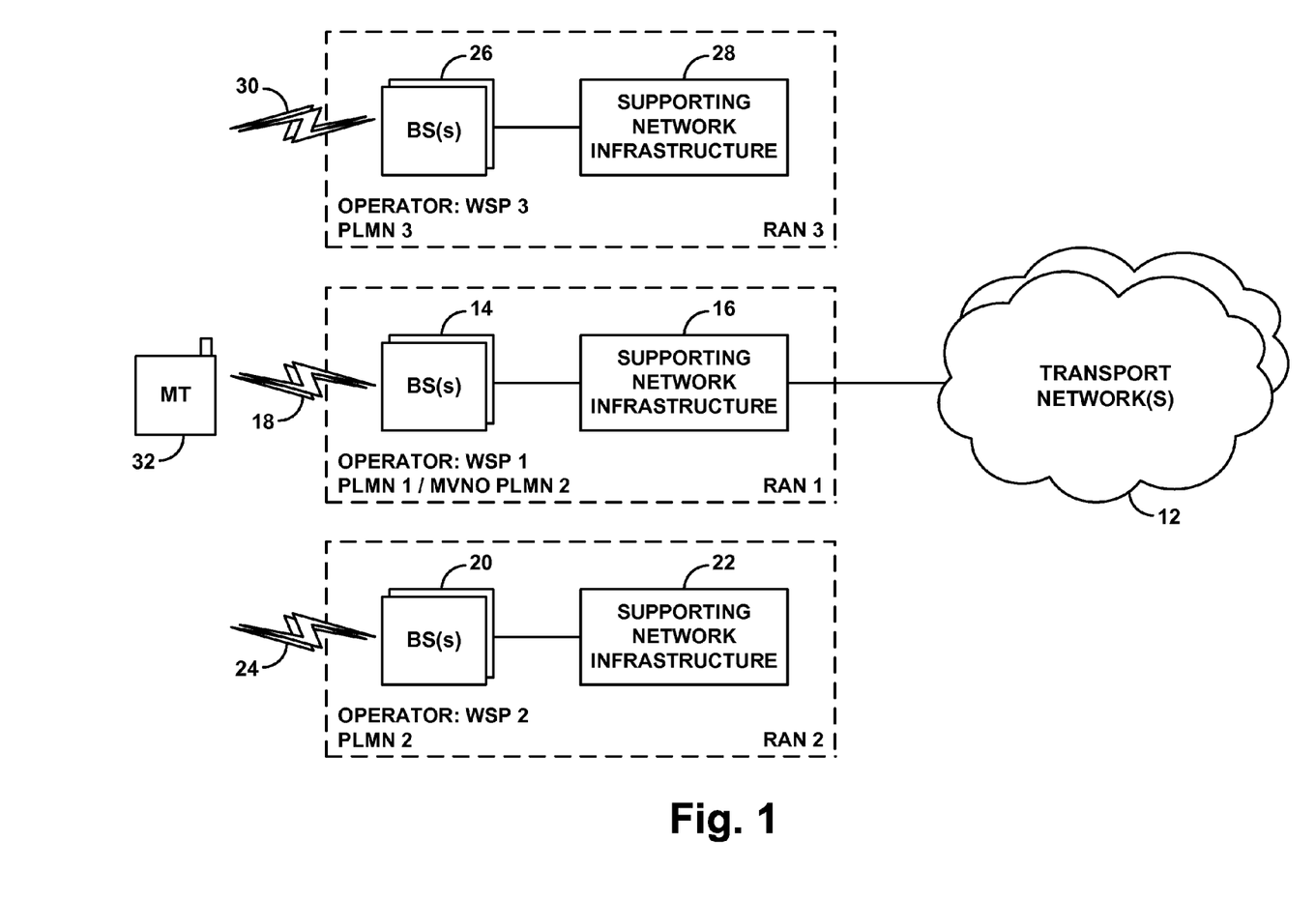
FIG. 1 is a simplified block diagram of an example communication system in which the present method can be implemented.

Although the RANs are shown as separate blocks in the figure, it should be understood that components of the various RANs may be co-located and/or integrated together in practice. For example, a base station of a given RAN may share an antenna tower with a base station of another RAN. And as another example, supporting network infrastructure of one RAN could function to support communications of another RAN as well, such as to provide the other RAN with connectivity to one or more transport networks. Further, although the supporting network infrastructure is shown separate from the base station(s) in each RAN, it should be understood that the infrastructure could be integrated with one or more of the base stations. Other variations are possible as well.

In the example system as shown, each of the illustrated RANs is operated by a respective wireless service provider (WSP). In particular, RAN 1 is operated by WSP 1, RAN 2 is operated by WSP 2, and RAN 3 is operated by WSP 3. Each of these WSPs may be a separate company, or various WSPs may be co-owned and perhaps branded differently. For instance, a given WSP may hold itself out as providing service under the brand name "WSP 1", whereas another WSP may hold itself out as providing service under the brand name "WSP 2". Or a single company may hold itself out as providing service under the name "WSP 1" separately under the name "WSP 2".

Further, each WSP may be licensed to operate a respective PLMN for providing communication service to mobile terminals, and the WSP may operate its RAN as at least part of its PLMN and further have MVNO and roaming agreements with other WSPs. In particular, WSP 1 may be licensed to operate PLMN 1 having PLMN ID 1, WSP 2 may be licensed to operate PLMN 2 having PLMN ID 2, and WSP 3 may be licensed to operate PLMN 3 having PLMN ID 3.

As shown by way of example, WSP 1 thus operates RAN 1 as PLMN 1, so the base stations of RAN 1 may broadcast PLMN ID 1 to indicate that they are part of PLMN 1. Further, WSP 1 also operates RAN 1 on behalf of PLMN 2 of WSP 2, and so RAN 1 is an MVNO PLMN for WSP 2 and the base stations of RAN 1 may also broadcast PLMN ID 2 to indicate that they are part of PLMN 2. WSP 2 then also operates RAN 2 as part of PLMN 2, and so the base stations of RAN 2 may broadcast PLMN ID 2 to indicate that they are part of PLMN 2. And WSP 3 operates RAN 3 as PLMN 3, so the base stations of RAN 3 may broadcast PLMN ID 3 to indicate that they are part of PLMN 3.

FIG. 1 then further depicts an example mobile terminal 32 currently served by a particular coverage area 18 of RAN 1. In practice, mobile terminal 32 may have a subscription with a particular one of the PLMNs. For instance, the mobile terminal may subscribe to service of PLMN 1 provided by WSP 1, in which case the mobile terminal may be currently served by its WSP 1. Alternatively, the mobile terminal may subscribe to service of PLMN 2 provided by WSP 2, in which case the mobile terminal may likewise be currently served by its WSP 2 with WSP 2 functioning as an MVNO using RAN 1 of WSP 1. Still alternatively, the mobile terminal may subscribe to service of PLMN 3 provided by WSP 3, in which case the mobile terminal may be currently roaming, being served by PLMN 1 of WSP 1 or by PLMN 2 of WSP 2.

The mobile terminal may be provisioned with data that specifies one or more PLMNs to which the mobile terminal subscribes. For instance, the mobile terminal may have data storage that holds the PLMN ID of each PLMN to which the mobile terminal subscribes. Further, the mobile terminal may be provisioned with program logic that causes the mobile terminal to prefer operation in coverage areas having a PLMN to which the mobile terminal subscribes.

Each of these RANs may operate in accordance with a particular radio access technology such as one of those noted above. By way of example, each of the illustrated RANs may be an LTE RAN, in which case each base station may be an LTE base station known as an eNodeB, and the supporting network infrastructure in each RAN may include elements such as a mobility management entity (MME), service gateway (SGW) and a packet gateway (PGW). As another example, each RAN may be a CDMA RAN, in which case each base station may be a CDMA base station known as a base transceiver station (BTS), and the supporting network infrastructure in each RAN may include elements such as a base station controller (BSC), radio network controller (RNC), mobile switching center (MSC), and packet data serving node (PDSN). Other examples are possible as well.

In practice, the air interface of each coverage area in the example communication system may define a downlink or forward link for carrying communications from the serving base station to served mobile terminals, and an uplink or reverse link for carrying communications from served mobile terminals to the serving base station. Depending on the radio access technology, these air interface links may take various forms and may define various channels for carrying particular data, such as control data and bearer traffic for instance.

By way of example, each coverage area may define a pilot channel or reference channel on which the base station may broadcast a pilot signal or reference signal that mobile terminals may detect as an indication of coverage and may measure to determine coverage strength. Further, each coverage area may define a control channel that carries various overhead messages, such as system information blocks or the like, specifying characteristics and operational parameters of the coverage area, such as one or more PLMN IDs of the coverage area for instance. Each coverage area may also have a respective coverage area identifier, such as a Physical Cell Identity (PCI) and/or pseudo-noise offset (PN offset) for instance, which could be indicated by the pilot or reference signal or specified in another overhead broadcast message or signal.

When a mobile terminal first powers on or enters into coverage of the network, the mobile terminal may scan for pilot or reference signals and determine for each detected signal a signal level (e.g., receive strength or signal-to-noise ratio) and corresponding coverage area identifier (e.g., PCI or PN offset). The mobile terminal may thereby identify a coverage area providing the strongest pilot or reference signal, possibly giving priority to coverage areas having a PLMN to which the mobile terminal subscribes, and may register or attach with the network by transmitting a registration request or attach request to the base station providing that signal.

In the registration or attach request, or in some other manner, the mobile terminal may convey to the base station an indication of a PLMN to which the mobile terminal subscribes, to enable the base station or supporting infrastructure to determine whether to serve the mobile terminal. With this data, for example, the base station may determine that the coverage area at issue has a PLMN corresponding with a PLMN to which the mobile terminal subscribes (e.g., has that very PLMN) or has a PLMN that has an MVNO relationship with a PLMN to which the mobile terminal subscribes and may agree to serve the mobile terminal on that basis. Or as another example, the base station may determine that the coverage area at issue has does not have a PLMN corresponding with a PLMN to which the mobile terminal subscribes but has a PLMN that has roaming relationship with a PLMN to which the mobile terminal subscribes and may agree to serve the mobile terminal on that basis.

At the time of registration/attachment or thereafter, the mobile terminal may also engage in signaling with the base station to enter into a connected or "active" mode, in which the base station has assigned to the mobile terminal a radio link connection over which the mobile terminal can engage in bearer communication with the base station and thereby with various other entities. In that mode, for instance, the mobile terminal may engage in packet data communications on the Internet and/or a voice call on the PSTN.

While in the connected/active mode, the mobile terminal may then continue to regularly scan pilot or reference signals, from both the coverage area serving the mobile terminal and from various other coverage areas. Alternatively or additionally, the base station may direct the mobile terminal to engage in such scanning from time to time. As the mobile terminal carries out this scanning, the mobile terminal may thus again determine the signal level of various coverage areas, and the identities of those coverage areas.

Further, the mobile terminal may from time to time in the connected/active mode transmit to its serving base station a measurement report that specifies the signal level of each coverage area detected by the mobile terminal. In particular, the measurement report may specify each detected coverage area (e.g., by coverage area identifier) and the signal level (e.g., reference signal receive strength, or signal-to-noise ratio) of the coverage area as determined by the mobile terminal. In practice, a given measurement report may thus include such information for the mobile terminal's currently serving coverage area and may also include such information for each of one or more other coverage areas detected by the mobile terminal.

When the serving base station receives such a measurement report from the mobile terminal, if the measurement report specifies signal level of another coverage area, the base station or other network node may engage in a process to decide whether to trigger handoff of the mobile device to the other coverage area. In general, this process may involve evaluating the reported signal level of the other coverage area to determine whether it is sufficiently strong itself and/or whether it is sufficiently stronger than the reported signal level of the serving coverage area. Further, the process may involve consideration of other factors as well, such as load and backhaul capacity for instance.

In terms of signal level, the network node may be configured to apply a handoff threshold to determine whether to trigger the handoff. Such a threshold may be a minimum extent to which the reported signal level of the target coverage area exceeds the reported signal level of the source coverage area in order to trigger the handoff, and could be set by default at a value in the range of 2 to 10 dB for instance. Thus, if the network node determines that the reported signal level of the target coverage area exceeds the reported signal level of the serving coverage area by at least that minimum extent, then the network node may trigger the handoff (possibly assuming other conditions are met as well), and otherwise the network node may not trigger the handoff.

Alternatively, the threshold may be more simply a minimum reported signal level of the target coverage area in order to trigger the handoff, which could be for instance at least −100 dBm or some other default value. Thus, if the network node determines that the reported signal level of the target coverage area is at least that minimum signal level, then the network node may trigger the handoff (again, possibly considering other factors as well), and otherwise the network node may not trigger the handoff.

The process of triggering the handoff may take various forms. In an LTE network, for instance, a serving base station would make the decision and would signal over an inter-base station link (X2 link) with the target base station to prepare the target base station for the handoff, and the serving base station would then transmit to the mobile terminal a connection reconfiguration message directing the terminal to transition from being served by the serving base station to being served by the target base station. Further, through additional signaling, bearer connections and context for the mobile terminal would be transferred from the serving base station to the target base station, so that the mobile terminal can then continue its active connection via the target base station.

In accordance with the present method, as discussed above, the base station or other network node will dynamically select and apply a handoff threshold to apply in a given instance based on a consideration of whether the mobile terminal is a home mobile terminal of the serving coverage area and whether the mobile terminal is a home mobile terminal of the target coverage area. To facilitate this, the network node may determine a PLMN to which the mobile terminal subscribes and may then determine (i) whether the serving coverage area corresponds with that PLMN and (ii) whether the target coverage area corresponds with that PLMN. And the network node may select a handoff threshold based on that determination.

The network node may determine a PLMN to which the mobile terminal subscribes by referring to a PLMN ID that the mobile terminal reported when it registered or attached with the serving base station. In particular, upon receipt of that PLMN ID data, the serving network node may store the data for later reference. Upon receipt of a measurement message from the mobile terminal, the network node may then refer to that data to determine the PLMN to which the mobile terminal subscribes. Alternatively, the network node may query the mobile terminal or one or more other entities to determine the PLMN to which the mobile terminal subscribes.

Separately for the serving coverage area and the target coverage area, the network node may then determine if the coverage area corresponds with the PLMN to which the mobile terminal subscribes.

To facilitate this, the network node may first determine one or more PLMN IDs of the coverage area. For the serving coverage area, the network node would presumably know the PLMN ID(s) of the coverage area or may query one or more other network nodes to find out. For the target coverage area, the network node may refer to a neighbor list that the network node maintains, which may list various coverage areas by coverage area identifier and specify for each coverage area the coverage area's PLMN ID(s) or other data (e.g., coverage area equipment vendor ID) that may correspond with and therefore indicate one or more PLMN IDs of the coverage area. From that neighbor list, the network node may thus determine the PLMN ID(s) of the reported target coverage area (e.g., by looking up the coverage area identifier and reading its PLMN ID, or by looking up the coverage area identifier, reading its equipment-vendor ID and correlating that equipment-vendor ID to a PLMN ID). Alternatively, the mobile terminal may include in its measurement report to the serving coverage area one or more PLMN IDs broadcast by the target coverage area.

The network node may then make a subsidiary determination of whether any of the one or more PLMN IDs of the coverage area corresponds match the PLMN ID of the PLMN to which the mobile terminal subscribes or whether any of the one or more PLMNs of the coverage area has an MVNO relationship with the PLMN to which the mobile terminal subscribes. For this purpose, the network node may be configured with a set of PLMN-relationship data that specifies relationships between PLMNs, such as PLMNs that are MVNOs hosted by other PLMNs or vice versa, and PLMNs that have roaming agreements with other PLMNs, and so forth. From that data, the network node may determine whether the any PLMN of the coverage area at issue has an MVNO relationship with the PLMN to which the mobile terminal subscribes or is instead a roaming partner of a PLMN to which the mobile terminal subscribes. The network node may thereby determine whether the mobile terminal is a home mobile terminal of the coverage area at issue, i.e., if the coverage area has a PLMN that corresponds with a PLMN to which the mobile terminal subscribes.

As noted above, if the network node determines that the mobile terminal is a home mobile terminal of the serving coverage area and a home mobile terminal of the target coverage area or that the mobile terminal is not a home mobile terminal of the serving coverage area and not a home mobile terminal of the target coverage area, then the network node may select and apply a particular default handoff threshold, such as the default minimum extent (e.g., 6 dB) or the default signal level (e.g., −100 dBm) as described above.

On the other hand, if the network node determines that the mobile terminal is a home mobile terminal of the serving coverage area but not a home mobile terminal of the target coverage area, then the network node may select and apply a more stringent handoff threshold, such as a higher minimum extent (e.g., 10 dB) or a higher minimum signal level (e.g., −90 dBm), to help deter handoff of the mobile terminal from the source coverage area to the target coverage area.

And if the network node determines that the mobile terminal is not a home mobile terminal of the serving coverage area but is a home mobile terminal of the target coverage area, then the network node may select and apply a more lenient handoff threshold, such as a lower minimum extent (e.g., 2 dB) or a lower minimum signal level (e.g., −110 dBm), to help foster handoff of the mobile terminal from the source coverage area to the target coverage area.

To facilitate this, the network node may be configured with data that specifies various handoff thresholds to apply, depending on (i) whether the serving coverage area corresponds with the PLMN to which the mobile terminal subscribes and (ii) whether the target coverage area corresponds with the PLMN to which the mobile terminal subscribes. Such data may be integrated with the PLMN-relationship data for instance, to specify particular thresholds to use depending on the relationships of the particular PLMNs at issue, in which case the network node may select particular threshold specific to those relationships.

Alternatively or additionally, the act of "selecting" a handoff threshold may involve applying an offset to a default threshold. Thus, if the default threshold is to be used, the offset may be zero, and if a more stringent or less stringent threshold is to be used, the offset may be more or less as appropriate.

In the arrangement of FIG. 1, for instance, as noted above, mobile terminal 32 is currently served by a coverage area of RAN 1, which we may assume has PLMN ID 1 for WSP 1 and PLMN ID 2 for MVNO WSP 2. In that scenario, if the mobile terminal detects a coverage area of RAN 2 or RAN 3 and reports signal level of that coverage area (and of its serving coverage area) to its serving base station, the serving base station may first determine the PLMN to which the mobile terminal subscribes, and the base station may then select a handoff threshold as discussed above.

By way of example, if the mobile terminal in that scenario subscribes to PLMN 1 or PLMN 2 and reported that it detected RAN 2 (PLMN 2), then the base station may determine that (i) PLMN 1 or PLMN 2 of serving coverage area matches the PLMN to which the mobile terminal subscribes and (ii) PLMN 2 of the target coverage area matches or has an MVNO relationship with the PLMN 1 to which the mobile terminal subscribes. Therefore the base station may select and apply a default handoff threshold.

As another example, if the mobile terminal subscribes to PLMN 1 or PLMN 2 and reported that it detected RAN 3 operating as PLMN 3, then the base station may determine that (i) PLMN 1 or PLMN 2 of the serving coverage area matches the PLMN to which the mobile terminal subscribes but (ii) PLMN 3 of the target coverage area does not match or have an MVNO relationship with a PLMN to which the mobile terminal subscribes. Therefore, the base station may select and apply a more stringent handoff threshold, to help deter the handoff of the mobile terminal from the serving coverage area to the target coverage area.

As yet another example, if the mobile terminal subscribes to PLMN 3 and reported that it detected RAN 2 (PLMN 2), then the base station may determine that (i) neither PLMN 1 nor PLMN 2 of the serving coverage area matches the PLMN to which the mobile terminal subscribes and (ii) PLMN 2 of the target coverage area does not match the PLMN to which the mobile terminal subscribes. Therefore, the base station may select and apply a default handoff threshold.

And as yet another example, if the mobile terminal subscribes to PLMN 3 and reported that it detected RAN 3 (PLMN 3), then the base station may determine that (i) neither PLMN 1 nor PLMN 2 of the serving coverage area matches the PLMN to which the mobile terminal subscribes but (ii) PLMN 3 of the target coverage matches the PLMN to which the mobile terminal subscribes Therefore, the base station may select and apply a more lenient handoff threshold, to help foster handoff of the mobile terminal from the serving coverage area to the target coverage area.

Figure 2:
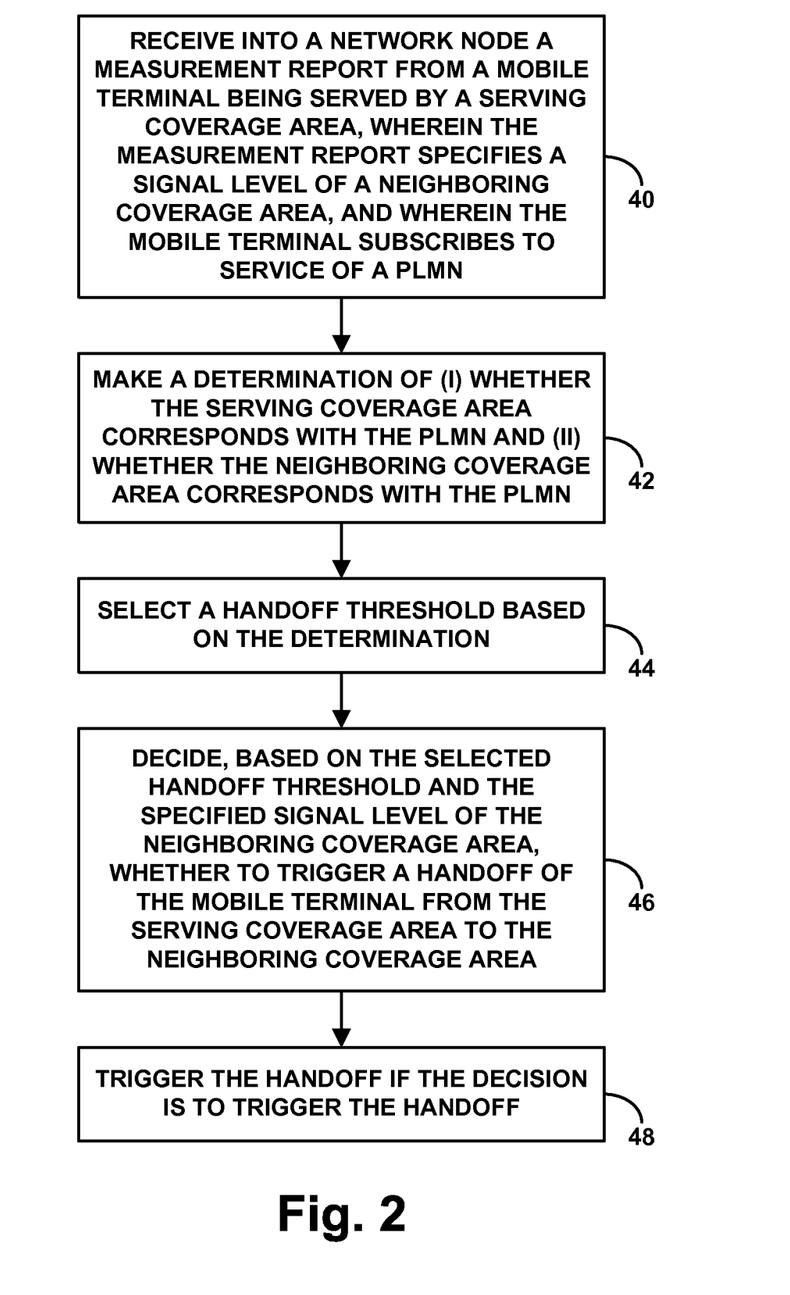
FIG. 2 is a flow chart depicting example functions that can be carried out in accordance with the method.

FIG. 2 is next a flow chart depicting functions that can be carried out in accordance with the present method. As shown in FIG. 2, at block 40, the method involves receiving into a network node a measurement report from a mobile terminal being served by a serving coverage area, wherein the measurement report specifies a signal level of a neighboring coverage area, and wherein the mobile terminal subscribes to service of a PLMN. At block 42, the method then involves the network node making a determination of (i) whether the serving coverage area corresponds with the PLMN and (ii) whether the neighboring coverage area corresponds with the PLMN. And at block 44, the method involves the network node selecting a handoff threshold based on that determination.

At block 46, the method the involves the network node making a decision, based on the selected handoff threshold and the specified signal level of the neighboring coverage area, of whether to trigger a handoff of the mobile terminal from the serving coverage area to the neighboring coverage area. And at block 48, the method involves the network node triggering the handoff only if the decision is to trigger the handoff.

In practice, the network node in this method may be a base station that radiates to define the serving coverage area and is thus currently serving the mobile terminal. Alternatively, the network node may take some other form, such as a mobility management entity, base station controller, or other portion of the serving RAN. Further, the handoff threshold may take various forms, such as those described above for instance.

Figure 3:
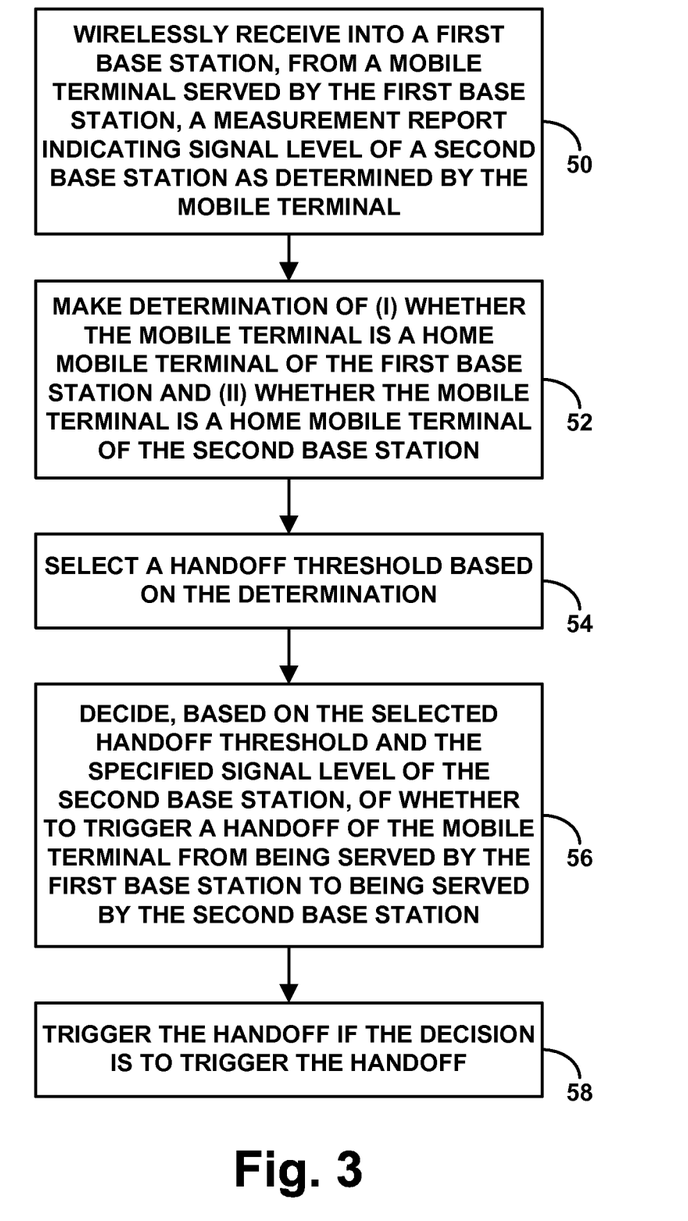
FIG. 3 is another flow chart depicting example functions that can be carried out in accordance with the method.

FIG. 3 is next another flow chart depicting functions that can be carried out in accordance with the present method. As shown in FIG. 3, at block 50, the method involves wirelessly receiving into a first base station, from a mobile terminal served by the first base station, a measurement report indicating signal level of a second base station as determined by the mobile terminal. At block 52, the method then involves the first base station making a determination of (i) whether the mobile terminal is a home mobile terminal of the first base station and (ii) whether the mobile terminal is a home mobile terminal of the second base station. And at block 54, the method involves the first base station selecting a handoff threshold based on that determination.

At block 56, the method then involves making a decision by the first base station, based on the selected handoff threshold and the specified signal level of the second base station, of whether to trigger a handoff of the mobile terminal from being served by the first base station to being served by the second base station. And at block 58, the method involves the first base station triggering the handoff only if the decision is to trigger the handoff.

Figure 4:
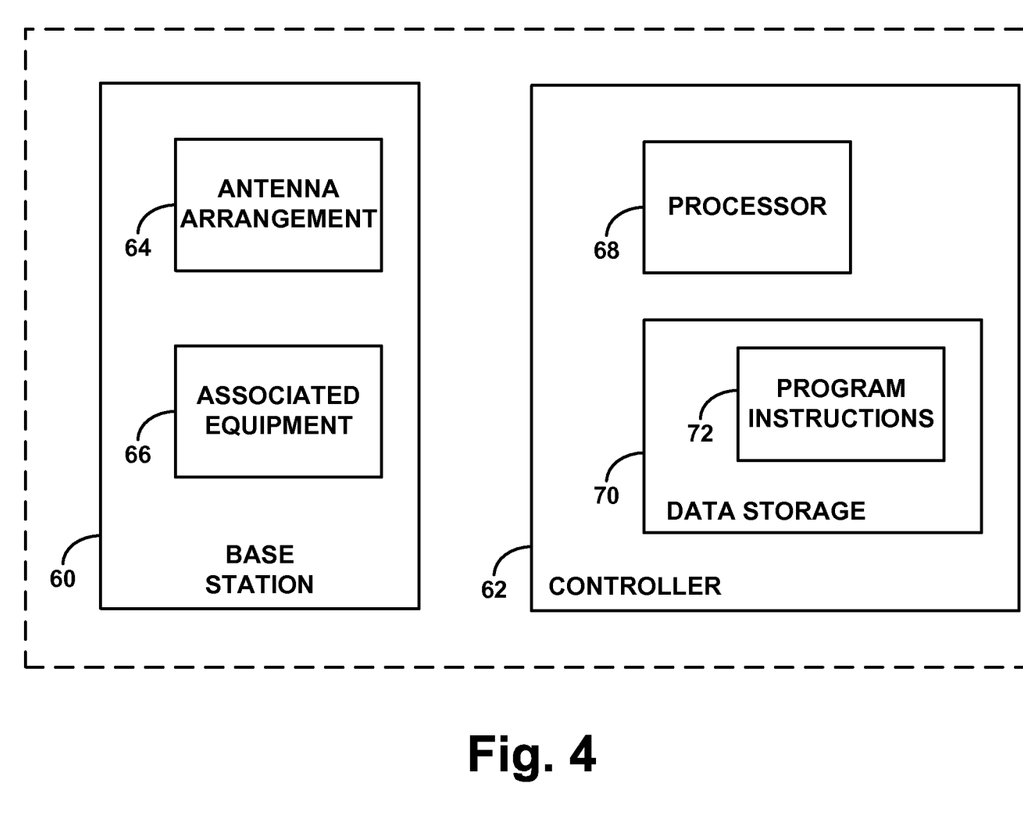
FIG. 4 is a simplified block diagram of an example system operable to carry out the method.

Finally, FIG. 4 is a simplified block diagram of a system configured to implement the present method. As shown in FIG. 4, the system includes a first base station 60 and a controller 62. Although these components are shown separately, it will be understood that they can be integrated together. For instance, the controller could be part of the base station such as a programmed host processor or other module of the base station.

As shown, the base station 60 includes an antenna arrangement 64 that radiates to define a coverage area in which to serve mobile terminals. Further, the base station includes associated equipment 66, such as a power amplifier for instance, to facilitate such communication.

As further shown, controller 62 may comprise a processor (e.g., one or more general purpose and/or special purpose processors) 68, non-transitory data storage (e.g., volatile or non-volatile storage such as optical, magnetic, or flash storage) 70, and program instructions 72 stored in the data storage and executable by the processor 68 to carry out various functions described herein. Alternatively, the controller may be arranged to carry out those functions in another manner.

In practice the controller may thus operate to (i) receive via the antenna arrangement, from a mobile terminal served by the first base station, a measurement report indicating signal level of a second base station as determined by the mobile terminal (ii) make a determination, based on a public land mobile identifier (PLMN ID) of the mobile terminal, whether the mobile terminal is a home mobile terminal of the first base station and whether the mobile terminal is a home mobile terminal of the second base station, (iii) select a handoff threshold based on the determination, (iv) make a decision, based on the selected handoff threshold and the specified signal level of the second base station, whether to trigger a handoff of the mobile terminal from being served by the first base station to being served by the second base station, and (v) trigger the handoff only if the decision is to trigger the handoff. Alternatively the controller could be arranged to carry out these or other functions in another way.

Exemplary embodiments have been described above. It should be understood, however, that variations from these embodiments are possible, while remaining within the true spirit and scope of the invention.

We claim:

1. A method comprising:
   receiving into a network node a measurement report from a mobile terminal being served by a serving coverage area, wherein the measurement report specifies a signal level of a neighboring coverage area, and wherein the mobile terminal subscribes to service of a public land mobile network (PLMN);
   making a determination by the network node of (i) whether the serving coverage area corresponds with the PLMN and (ii) whether the neighboring coverage area corresponds with the PLMN;
   based on the determination, selecting by the network node a handoff threshold;
   making a decision by the network node, based on the selected handoff threshold and the specified signal level of the neighboring coverage area, of whether to trigger a handoff of the mobile terminal from the serving coverage area to the neighboring coverage area; and
   triggering the handoff by the network node only if the decision is to trigger the handoff.

2. The method of claim 1, wherein the network node is a base station that radiates to define the serving coverage area and is thus currently serving the mobile terminal.

3. The method of claim 1, further comprising determining by the network node the PLMN to which the mobile terminal subscribes.

4. The method of claim 1, wherein the handoff threshold is a minimum extent that signal level of the neighboring coverage area is required to exceed signal level of the serving coverage area in order to trigger the handoff, and wherein selecting the handoff threshold based on the determination comprises:

if the determination is that the both the serving coverage area and neighboring coverage area correspond with the PLMN or both the serving coverage area and neighboring coverage area do not correspond with the PLMN, then selecting as the handoff threshold a first minimum extent;

if the determination is that the serving coverage area corresponds with the PLMN but the neighboring coverage area does not correspond with the PLMN, then selecting as the handoff threshold a second minimum extent greater than the first minimum extent; and     if the determination is that the serving coverage area does not correspond with the PLMN but the neighboring coverage area corresponds with the PLMN, then selecting as the handoff threshold a third minimum extent less than the first minimum extent.

5. The method of claim 1, wherein the handoff threshold is a minimum signal level of the neighboring coverage area in order to trigger the handoff, and wherein selecting the handoff threshold based on the determination comprises:

if the determination is that the both the serving coverage area and neighboring coverage area correspond with the PLMN or both the serving coverage area and neighboring coverage area do not correspond with the PLMN, then selecting as the handoff threshold a first minimum signal level;

if the determination is that the serving coverage area corresponds with the PLMN but the neighboring coverage area does not correspond with the PLMN, then selecting as the handoff threshold a second minimum signal level greater than the first minimum signal level; and     if the determination is that the serving coverage area does not correspond with the PLMN but the neighboring coverage area corresponds with the PLMN, then selecting as the handoff threshold a third minimum signal level less than the first minimum signal level.

6. The method of claim 1, wherein making the determination of whether the neighboring coverage area corresponds with the PLMN to which the mobile terminal subscribes comprises:

referring to a neighbor list that specifies various coverage areas and for each specified coverage area indicates a PLMN of the coverage area, to determine from the neighbor list a PLMN of the neighboring coverage area;

making a subsidiary determination of whether or not the determined PLMN of the neighboring coverage area is the same as or associated with the PLMN to which the mobile terminal subscribes; and     determining that the neighboring coverage area corresponds with the PLMN to which the mobile terminal subscribes only if the subsidiary determination is that the determined PLMN of the neighboring coverage area is the same as or associated with the PLMN to which the mobile terminal subscribes.

7. The method of claim 6, wherein the neighbor list indicates the PLMN of each coverage area at least in part by indicating an equipment-vendor for the coverage area, wherein the equipment vendor of each coverage area corresponds with the PLMN of the coverage area.

8. The method of claim 1, wherein the serving coverage area is part of a particular PLMN, and wherein making the determination of whether the serving coverage area corresponds with the PLMN to which the mobile terminal subscribes comprises:

making a subsidiary determination of whether or not the particular PLMN is the same as or associated with the PLMN to which the mobile terminal subscribes; and     determining that the serving coverage area corresponds with the PLMN to which the mobile terminal subscribes only if the subsidiary determination is that the particular PLMN is the same as or associated with the PLMN to which the mobile terminal subscribes.

9. A method comprising:

wirelessly receiving into a first base station, from a mobile terminal served by the first base station, a measurement report indicating signal level of a second base station as determined by the mobile terminal;

making a determination, by the first base station, of (i) whether the mobile terminal is a home mobile terminal of the first base station and (ii) whether the mobile terminal is a home mobile terminal of the second base station;

based on the determination, selecting by the first base station a handoff threshold;

making a decision by the first base station, based on the selected handoff threshold and the specified signal level of the second base station, of whether to trigger a handoff of the mobile terminal from being served by the first base station to being served by the second base station; and     triggering the handoff by the first base station only if the decision is to trigger the handoff.

10. The method of claim 9, wherein making the determination of whether the mobile terminal is a home mobile terminal of the first base station comprises determining whether a public land mobile network identifier (PLMN ID) of the mobile terminal corresponds with a PLMN ID of the first base station.

11. The method of claim 9, wherein the first base station is operated by a wireless service provider, and wherein making the determination of whether the mobile terminal is a home mobile terminal of the first base station comprises:

determining that the mobile terminal is a home mobile terminal of the first base station only if the mobile terminal subscribes to service of the wireless service provider or of a mobile virtual network operator (MVNO) of the wireless service provider.

12. The method of claim 9, wherein making the determination of whether the mobile terminal is a home mobile terminal of the second base station comprises:

determining from neighbor list data a public land mobile network identifier (PLMN ID) of the second base station; and     determining whether a PLMN ID of the mobile terminal corresponds with the determined PLMN ID of the second base station.

13. The method of claim 9, wherein the handoff threshold is a minimum extent that signal level of the second base station is required to exceed signal level of the first base station in order to trigger the handoff, and wherein selecting the handoff threshold based on the determination comprises:

selecting as the handoff threshold a first minimum extent if (a) the determination is that the mobile terminal is a home mobile terminal of the first base station and the mobile terminal is a home mobile terminal of the second base station or (b) the determination is that the mobile terminal is not a home mobile terminal of the first base station and the mobile terminal is not a home mobile terminal of the second base station;

selecting as the handoff threshold a second minimum extent greater than the first minimum extent if the determination is that the mobile terminal is a home mobile terminal of the first base station but is not a home mobile terminal of the second base station; and selecting as the handoff threshold a third minimum extent less than the first minimum extent if the determination is that the mobile terminal is not a home mobile terminal of the first base station but is a home mobile terminal of the second base station.

14. The method of claim 9, wherein the handoff threshold is a minimum signal level of the second base station in order to trigger the handoff, and wherein selecting the handoff threshold based on the determination comprises:

selecting as the handoff threshold a first minimum signal level if (a) the determination is that the mobile terminal is a home mobile terminal of the first base station and the mobile terminal is a home mobile terminal of the second base station or (b) the determination is that the mobile terminal is not a home mobile terminal of the first base station and the mobile terminal is not a home mobile terminal of the second base station;

selecting as the handoff threshold a second minimum signal level greater than the first minimum signal level if the determination is that the mobile terminal is a home mobile terminal of the first base station but is not a home mobile terminal of the second base station; and selecting as the handoff threshold a third minimum signal level less than the first minimum signal level if the determination is that the mobile terminal is not a home mobile terminal of the first base station but is a home mobile terminal of the second base station.

15. A system comprising:

a first base station having an antenna arrangement for radiating to define a cellular coverage in which to serve mobile terminals; and a controller configured to (i) receive via the antenna arrangement, from a mobile terminal served by the first base station, a measurement report indicating signal level of a second base station as determined by the mobile terminal (ii) make a determination, based on a public land mobile identifier (PLMN ID) of the mobile terminal, whether the mobile terminal is a home mobile terminal of the first base station and whether the mobile terminal is a home mobile terminal of the second base station, (iii) select a handoff threshold based on the determination, (iv) make a decision, based on the selected handoff threshold and the specified signal level of the second base station, whether to trigger a handoff of the mobile terminal from being served by the first base station to being served by the second base station, and (v) trigger the handoff only if the decision is to trigger the handoff.

16. The system of claim 15, wherein the controller is part of the first base station.

17. The system of claim 15, wherein the controller is configured to make the determination of whether the mobile terminal is a home mobile terminal of the first base station based on determining whether a public land mobile network identifier (PLMN ID) of the mobile terminal corresponds with a PLMN ID of the first base station.

18. The system of claim 15, wherein the controller is configured to make the determination of whether the mobile terminal is a home mobile terminal of the second base station based on (i) determining from neighbor list data a public land mobile network identifier (PLMN ID) of the second base station and (ii) determining whether a PLMN ID of the mobile terminal corresponds with the determined PLMN ID of the second base station.

19. The system of claim 15, wherein the handoff threshold is a minimum extent that signal level of the second base station is required to exceed signal level of the first base station in order to trigger the handoff, wherein the controller is configured to select as the handoff threshold a first minimum extent if the determination is that the mobile terminal is a home mobile terminal of the first base station but is not a home mobile terminal of the second base station, and wherein the controller is configured to select as the handoff threshold a second minimum extent less than the first minimum extent if the determination is that the mobile terminal is not a home mobile terminal of the first base station but is a home mobile terminal of the second base station.

20. The system of claim 15, wherein the handoff threshold is a minimum signal level of the second base station in order to trigger the handoff, wherein the controller is configured to select as the handoff threshold a first minimum signal level if the determination is that the mobile terminal is a home mobile terminal of the first base station but is not a home mobile terminal of the second base station, and wherein the controller is configured to select as the handoff threshold a second minimum signal level less than the first minimum signal level if the determination is that the mobile terminal is not a home mobile terminal of the first base station but is a home mobile terminal of the second base station.

* * * * *